United States Patent [19]

Birkel et al.

[11] Patent Number: 5,038,098
[45] Date of Patent: Aug. 6, 1991

[54] SIMULTANEOUS DISPLAY OF TWO UNRELATED SIGNALS

[75] Inventors: Steven J. Birkel; Gilbert A. Hoffman, both of Aloha, Oreg.

[73] Assignee: Tektronix, Inc., Beaverton, Oreg.

[21] Appl. No.: 274,689

[22] Filed: Nov. 22, 1988

Related U.S. Application Data

[63] Continuation of Ser. No. 840,105, Mar. 17, 1986, abandoned.

[51] Int. Cl.⁵ .................... G01R 13/28; H04N 17/02
[52] U.S. Cl. .................................. 324/121 R; 358/10
[58] Field of Search ............... 324/121 R; 358/10, 139

[56] References Cited

U.S. PATENT DOCUMENTS

| | | | |
|---|---|---|---|
| 3,614,304 | 10/1971 | Schonfelder | 178/5.4 TE |
| 3,938,003 | 2/1976 | Shimizu | 315/392 |
| 4,249,171 | 2/1981 | Batcher | 324/121 R X |
| 4,399,462 | 8/1983 | Balopole et al. | 358/183 |
| 4,567,405 | 1/1986 | Bristol | 324/121 R X |
| 4,635,094 | 1/1987 | Thong | 358/10 |

FOREIGN PATENT DOCUMENTS

| | | | |
|---|---|---|---|
| 1049907 | 2/1959 | Fed. Rep. of Germany | |
| 114770 | 6/1985 | Japan | 324/121 R |
| 144665 | 7/1985 | Japan | 324/121 R |

OTHER PUBLICATIONS

SMPTE Journal, Lang et al., "Testing Color Reproduction by Means of a Programmable Color Bar Generator"; vol. 87, Sep. 1978; 579–82.
Pogson, I., "Oscilloscope Smith"; Electronics Australia, Feb. 1981, vol. 43, No. 2; pp. 40–44.
Morgan, J., "4–Trace Converter for Oscilloscopes", Popular Electronics, Jul. 1982; pp. 57–60.

Primary Examiner—Stephen M. Baker
Attorney, Agent, or Firm—Francis I. Gray

[57] ABSTRACT

A device for simultaneously displaying unrelated signals processes the signals separately prior to inputting them to a multiplexer. Under control of a microprocessor the multiplexer. Under control of a microprocessor the multiplexer switches between the processed signals to alternately pass the signals to the deflection circuits of an X-X display device at a rate which does not interfere with other frequencies used in the environment where the device is used.

1 Claim, 2 Drawing Sheets

SIMULTANEOUS DISPLAY OF TWO UNRELATED SIGNALS

This is a continuation of U.S. application Ser. No. 840,105 filed Mar. 17, 1986 and now abandoned.

BACKGROUND OF THE INVENTION

The present invention relates to signal displays, and more particularly to the simultaneous display of unrelated signals such as a television video signal and a stereo audio signal associated therewith.

In the television industry there are currently vectorscopes to display video signals and separate audio instruments to display the associated audio signal. These separate instruments are required since these two signals are processed in completely different ways. To display two signals simultaneously on an instrument the usual technique is to input the signals to a multiplexer at the front end of the instrument so that the signals are subjected to the same processing after the multiplexer and prior to display. This technique is not possible where the processing for the two signals is required to be different. Therefore, what is desired is a technique for simultaneously displaying two signals which require different processing on a single display.

SUMMARY OF THE INVENTION

Accordingly, the present invention provides a simultaneous display of unrelated signals by processing the signals independently of each other and combining them via a multiplexer just prior to display. The rate of switching of the multiplexer between the signals is controlled by a microprocessor and is selected to be a frequency which maintains a good display while avoiding beat frequencies with other frequencies in the environment in which the instrument is used.

The objects, advantages and novel features of the present invention will be apparent from the following detailed description when read in conjunction with the appended claims and attached drawing.

DESCRIPTION OF THE PREFERRED EMBODIMENT

Figure 1:
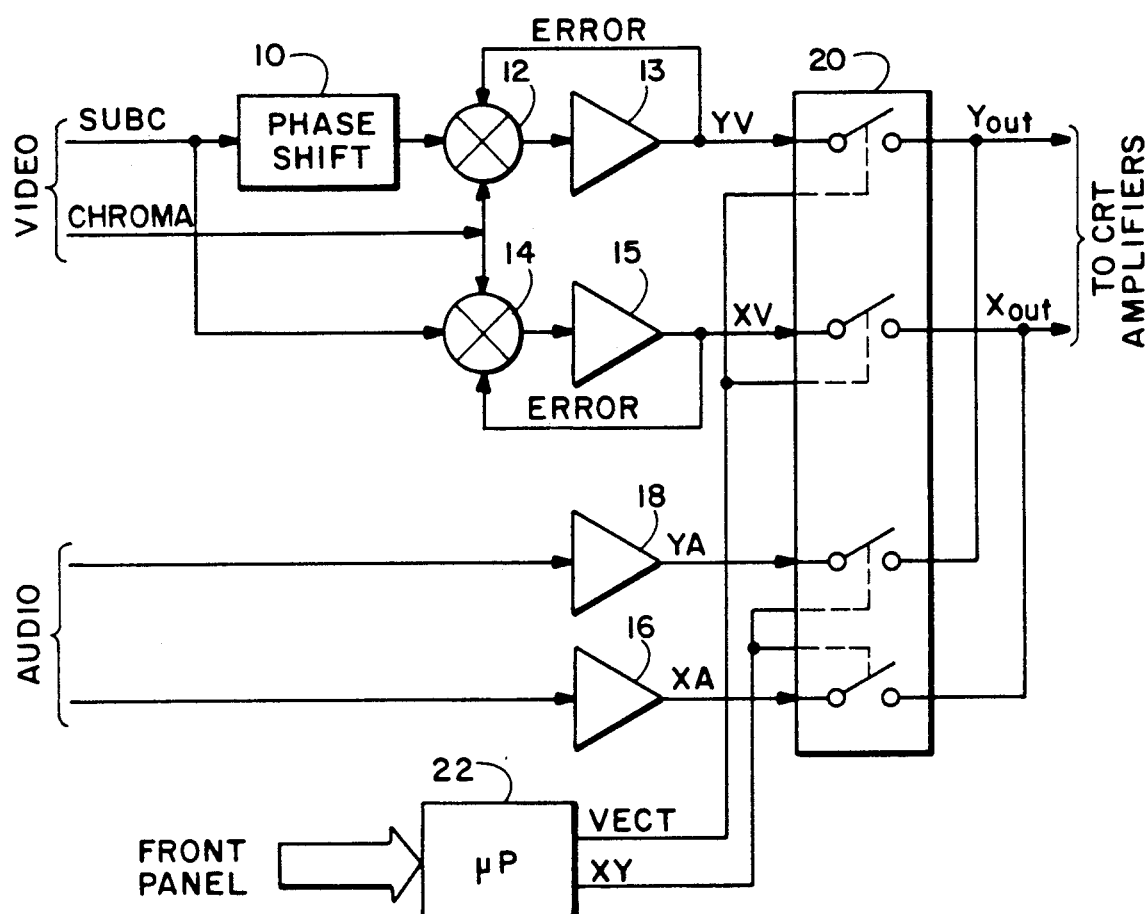
FIG. 1 is a block diagram of a simultaneous display system according to the present invention.

Referring to FIG. 1 a normal television signal is decoded into a subcarrier signal SUBC and a chrominance signal CHROMA. SUBC is input into a phase shifter 10 which shifts the phase by 90°. The phase shifted SUBC is input to a first modulator 12, and the unshifted SUBC is input to a second modulator 14. Also input to the modulators 12 and 14 is CHROMA. The output of the modulators 12 and 14 are input to respective error amplifiers 13 and 15, the outputs of which are the X and Y components of the input CHROMA, i.e., XV and YV. The outputs of the error amplifiers 13 and 15 are added back as error clamping voltages to the demodulated signals at the modulators 12 and 14, respectively. This error signal serves to maintain the vector representation of the video signal at the center of the display so that both the video and audio representations are aligned properly, i.e., they share a common center dot. If independent positioning of the two representations is desired, the offset to these amplifiers 13 and 15 may be adjusted.

A stereo audio signal is separated into its left and right channels and amplified by respective amplifiers 16 and 18 to form XA and YA. The X and Y components of the video and the audio signals are input to a multiplexer 20. The outputs of the multiplexer 20 are an X component, XOUT, and a Y component, YOUT, of the selected input signal. The switching of the multiplexer 20 is controlled by signals from a microprocessor 22 which outputs a VECT signal to switch the video signal and an XY signal to switch the audio signal, depending upon the display mode selected by an operator at the front panel of the instrument. XOUT and YOUT from the multiplexer 20 are input to the deflection circuits of the display device and displayed as is well known in the art.

Figure 2:
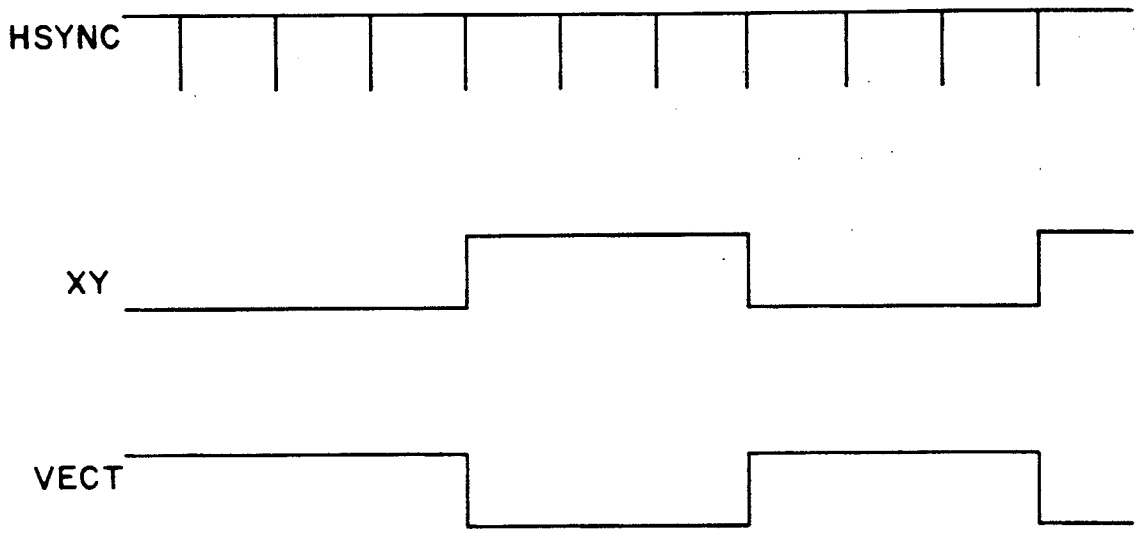
FIG. 2 is a timing diagram for the system of FIG. 1.
Figure 3:
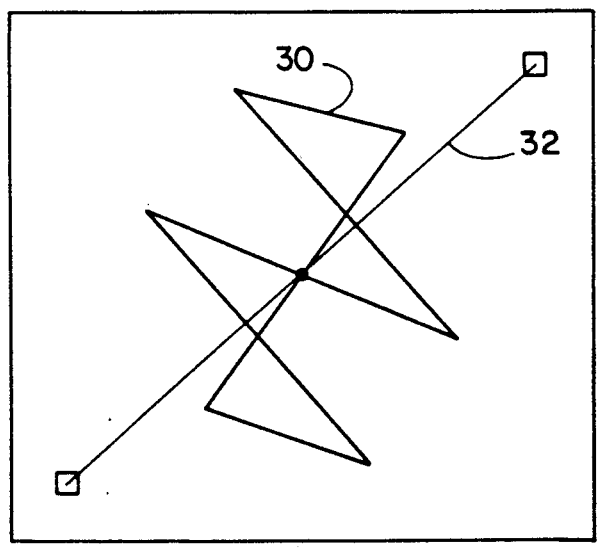
FIG. 3 is an illustration of a display according to the present invention.

In operation the operator selects for display either the video signal, the audio signal or both video and audio signals simultaneously. If only one signal is selected for display, then the corresponding control signal, VECT or XY, is high while the other control signal is low so that the multiplexer 20 passes only that selected signal to the display X and Y deflection circuits. A simultaneous display of a video signal 30 and an audio signal 32 is shown in FIG. 3. Referring to FIG. 2 the rate of switching between the audio and video signals is unrelated to the line frequency of the video signal as represented by HSYNC as there is no correlation between the line sync and the audio timing. The video and audio signals are alternately switched at a rate which assures a good display while not interfering with any other signals in the environment in which the instrument is used. Such a rate as 300 Hz may be used, which frequency is greater than the field rate of the video, but much less than the normal audio test tones of 1 kHz or 2 kHz used in a television studio.

Thus, the present invention provides for the simultaneous display of unrelated signals, such as television video and stereo audio signals, on a single display by processing the signals prior to multiplexing the signals at the deflection circuits of the display device.

What is claimed is:

1. An apparatus for displaying a video chrominance signal and a stereo audio signal simultaneously on a television vectorscope comprising:

means for decoding the video chrominance signal into two components for input respectively to an X-input and a Y-input of the television vectorscope;

means for separating the stereo audio signal into two channels for input respectively to the X-input and the Y-input;

means for switching the X-input and the Y-input between the two components and the two channels; and means for controlling the switching means in response to a selected display mode to display either the video chrominance signal or the stereo audio signal or both simultaneously on the television vectorscope, the controlling means switching between the video chrominance signal and the stereo audio signal when the selected display mode is for both simultaneously at a rate which does not interfere with other frequencies related to the video chrominance signal or the stereo audio signal.

* * * * *